US009677965B2

(12) United States Patent
Sahara et al.

(10) Patent No.: US 9,677,965 B2
(45) Date of Patent: Jun. 13, 2017

(54) PRESSURE GAUGE

(71) Applicant: ASAHI INDUSTRY CO., LTD., Tokyo (JP)

(72) Inventors: Masanori Sahara, Tokyo (JP); Kazuaki Shimbo, Tokyo (JP)

(73) Assignee: ASAHI INDUSTRY CO., LTD., Tokyo (JP)

( * ) Notice: Subject to any disclaimer, the term of this patent is extended or adjusted under 35 U.S.C. 154(b) by 49 days.

(21) Appl. No.: 14/786,001

(22) PCT Filed: Jul. 28, 2014

(86) PCT No.: PCT/JP2014/003958
§ 371 (c)(1),
(2) Date: Oct. 21, 2015

(87) PCT Pub. No.: WO2016/016912
PCT Pub. Date: Feb. 4, 2016

(65) Prior Publication Data
US 2016/0161356 A1    Jun. 9, 2016

(51) Int. Cl.
*G01L 27/00* (2006.01)
*B60C 19/00* (2006.01)
(Continued)

(52) U.S. Cl.
CPC ............ *G01L 27/007* (2013.01); *B60C 19/00* (2013.01); *B60C 99/00* (2013.01); *G01L 7/163* (2013.01);
(Continued)

(58) Field of Classification Search
CPC ....... G01L 7/00; G01L 19/0007; G01L 19/04; G01L 7/04; G01L 13/02; G01L 27/00;
(Continued)

(56) References Cited

U.S. PATENT DOCUMENTS 4,885,940 A * 12/1989 Huang .................... G01L 7/166
73/744
5,983,728 A   11/1999 Weng
2004/0113813 A1   6/2004 Henson et al.

FOREIGN PATENT DOCUMENTS

JP       50-65475      6/1975
JP       10-288560    10/1998
(Continued)

OTHER PUBLICATIONS

International Search Report issued Sep. 9, 2014 in International Application No. PCT/JP2014/003958.
(Continued)

*Primary Examiner* — John Fitzgerald
*Assistant Examiner* — Truong Phan
(74) *Attorney, Agent, or Firm* — Wenderoth, Lind & Ponack, L.L.P.

(57) ABSTRACT

A pressure gauge of which the presence or absence of a measurement error can be easily checked is provided. A pressure gauge includes: a piston; a first conversion mechanism converting a linear motion of the piston against an elastic force of a spring into a rotating motion about a first rotation shaft, the linear motion being caused by the pressure transmitted from a target to be measured; an index that is fixed to one end side of the first rotation shaft; a dial; momentum detecting means for detecting momentum indicating an amount of movement of the piston; and a pressure sensor measuring a pressure value or the pressure acting on the internal space of the cylinder. Determining means determines whether a difference between a first measurement value and a second measurement value exceeds a predetermined value, the first measurement, value being estimated from the momentum detected toy the momentum detecting means, the second measurement value being measured by the pressure sensor. Notifying means notifies a user if the
(Continued)

difference between the first measurement value and the second measurement value exceeds the predetermined value.

6 Claims, 9 Drawing Sheets

(51) Int. Cl.
| | | |
|---|---|---|
| *G01L 17/00* | (2006.01) | |
| *G01L 7/16* | (2006.01) | |
| *G01L 9/00* | (2006.01) | |
| *G01L 9/14* | (2006.01) | |
| *G01L 19/02* | (2006.01) | |
| *G01L 19/12* | (2006.01) | |
| *B60C 99/00* | (2006.01) | |

(52) U.S. Cl.
CPC ............ *G01L 7/166* (2013.01); *G01L 9/0089* (2013.01); *G01L 9/14* (2013.01); *G01L 17/00* (2013.01); *G01L 19/02* (2013.01); *G01L 19/12* (2013.01)

(58) Field of Classification Search
CPC ... G01L 13/025; G01L 9/0029; G01L 9/0026; G01L 9/10; G01L 9/06; F16K 37/0075; F16K 17/16; G01N 3/10; G01M 99/00; F02D 41/222; A61B 5/02156; F15B 19/002
USPC ..... 73/1.57, 1.59, 1.68, 1.71, 700, 735, 716, 73/736
See application file for complete search history.

(56) References Cited

FOREIGN PATENT DOCUMENTS

| | | |
|---|---|---|
| JP | 2006-510035 | 3/2006 |
| JP | 3135157 | 9/2007 |
| WO | 2004/053450 | 6/2004 |
| WO | 2006/046798 | 5/2006 |

OTHER PUBLICATIONS

International Preliminary Report on Patentability issued Jan. 31, 2017 in International Application No. PCT/JP2014/003958.

* cited by examiner

PRESSURE GAUGE

TECHNICAL FIELD

The present invention relates to a pressure gauge for measuring air pressure of a tire.

BACKGROUND ART

A pressure gauge has conventionally been known as an apparatus for measuring air pressure of a tire of a vehicle/aircraft, etc.

Generally, a pressure gauge of ten employs a mechanical pressure measurement method using elasticity of a spring because of its measurement accuracy and high reliabilities in on-site handling, such as shock, resistance and durability.

SUMMARY OF INVENTION

Technical Problem

However, since the conventional pressure gauge employing the foregoing pressure measurement method of spring type employs a mechanical measurement method, abrasion, spring wear-out, mechanical backlash, and the like increase with repeated use.

Such an increase of abrasion and mechanical backlash is a physically inevitable phenomenon of a pressure gauge that employs the pressure measurement method of spring type.

The foregoing mechanical problems attributed to repeated use and the like can result in the occurrence of a measurement error in pressure measurement.

In view of the foregoing, some manufactures of pressure gauges may recommend periodic inspection using testing equipment to ensure reliability of the pressure measurement value. However, with such a method for securing reliability, the presence or absence of a measurement error is not able to be checked unless the users subject the pressure gauges to a regular inspection.

The present invention has been achieved in view of the foregoing problem, and it is an object thereof to provide a pressure gauge of which the presence or absence of a measurement error can be easily checked without performing an inspection or the like using special testing equipment or the like.

Solution to Problem

To solve the foregoing problem, an aspect of the present invention relates to a pressure gauge including; a piston; a cylinder that has an internal space for slidably guiding the piston in a predetermined direction and has an opening for transmitting pressure from a target of which to measure pressure to the internal space; a stopper that restricts sliding of the piston in the internal space toward the opening to stop the piston at a predetermined position; a spring that biases the piston toward the opening and press the piston against the stopper; a first conversion mechanism that converts a linear motion of the piston against an elastic force of the spring into a rotating motion about a first rotation shaft, the linear motion being caused by the pressure transmitted from the target to be measured to the internal space via the opening; an index that is fixed to one end side of the first rotation shaft; a dial that displays a measurement value to be indicated by the index rotating about the first rotation shaft; momentum detecting means for detecting momentum indicating an amount of movement of the piston; a pressure sensor that measures a pressure value of the pressure acting on the internal space of the cylinder; determining means for determining whether a difference between a first measurement value and a second measurement value exceeds a predetermined value, the first measurement value being estimated from the momentum detected by the momentum detecting means and indicated on the dial by the index, the second measurement value being measured by the pressure sensor; and notifying means for notifying a user if the determining means determines that the difference between the first measurement value and the second measurement value exceeds the predetermined value.

Advantageous Effects of Invention

As described in detail above, according to the present invention, a pressure gauge of which the presence or absence of a measurement error can be easily checked without performing an inspection or the like using special testing equipment or the like can be provided.

DESCRIPTION OF EMBODIMENTS

Hereinafter, embodiments of the present invention will be described with reference to the drawings.

First Embodiment

Initially, a first embodiment, of the present invention will be described.

<Apparatus Configuration>

Figure 1:
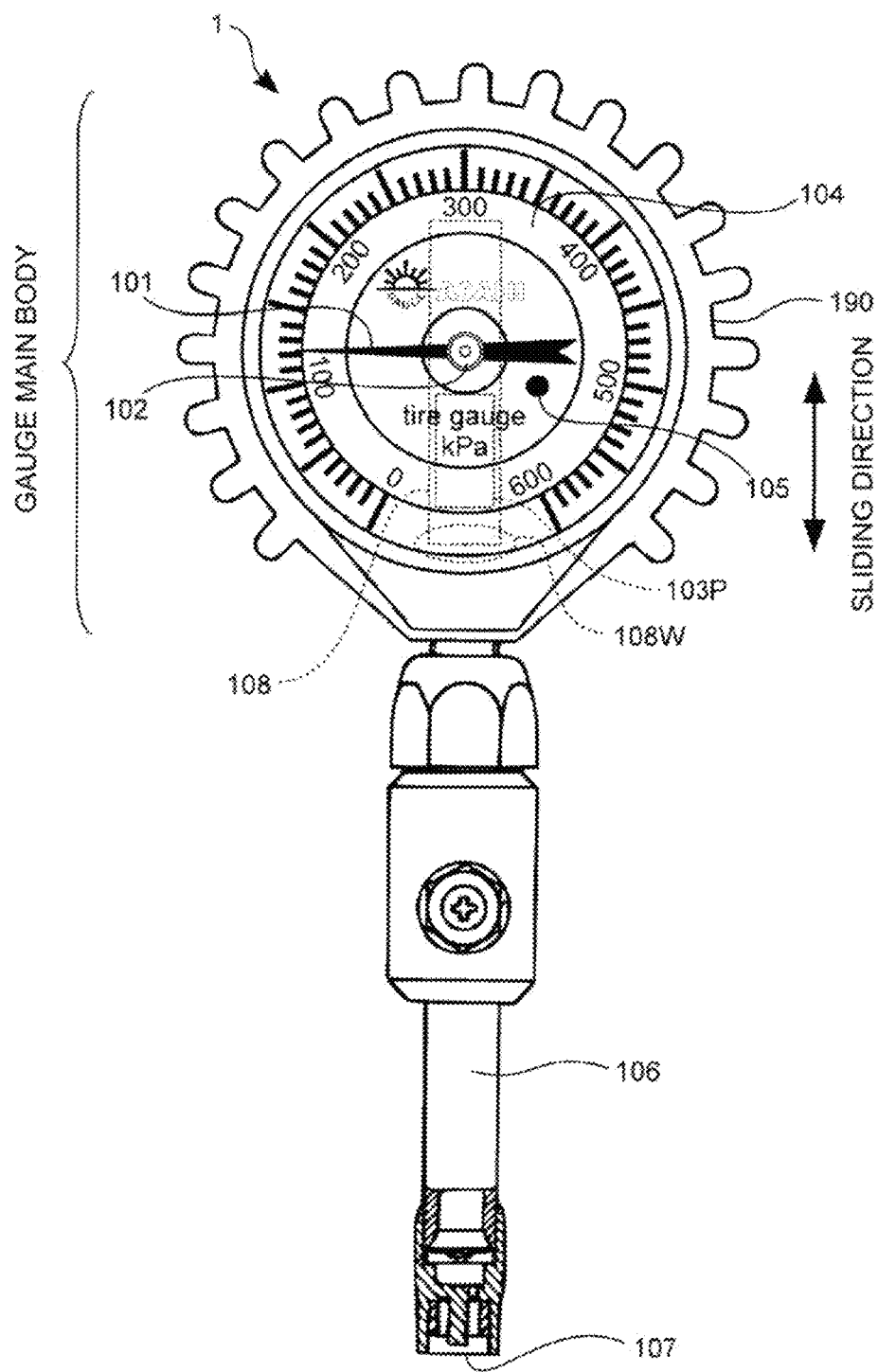
FIG. 1 is a general overall view showing a general appearance of an entire pressure gauge according to a first embodiment.

FIG. 1 is a general overall view showing a general appearance of an entire pressure gauge according to the first embodiment. The pressure gauge according to the present embodiment measures air pressure of a tire of a vehicle, an aircraft, or the like of which to measure pressure.

The pressure gauge according to the present embodiment includes a gauge main body, a pressure guiding pipe 106, and a connection portion 107. It will be understood that such a configuration is just an example. For example, a configuration in which the connection portion is provided to the gauge main body may also be employed.

If the connection portion 107 is connected to a valve of the tire or the like of which to measure the pressure, the air pressure in the tire is transmitted to a piston 103P to be described later of the gauge main body through the pressure guiding pipe 106 via the connection portion 107. A pressure value of the pressure transmitted to the gauge main body is indicated on a dial 104 of the gauge main body.

Figure 2:
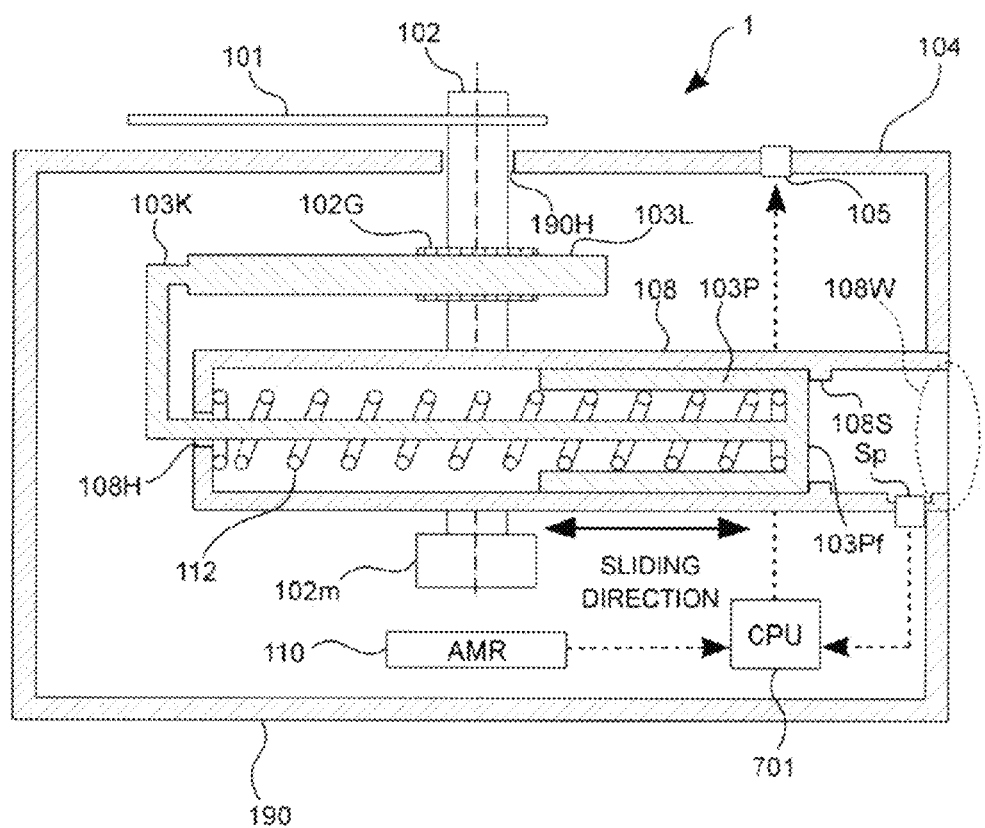
FIG. 2 is a schematic diagram for describing a driving principle of the pressure gauge 1 according to the first embodiment.
Figure 3:
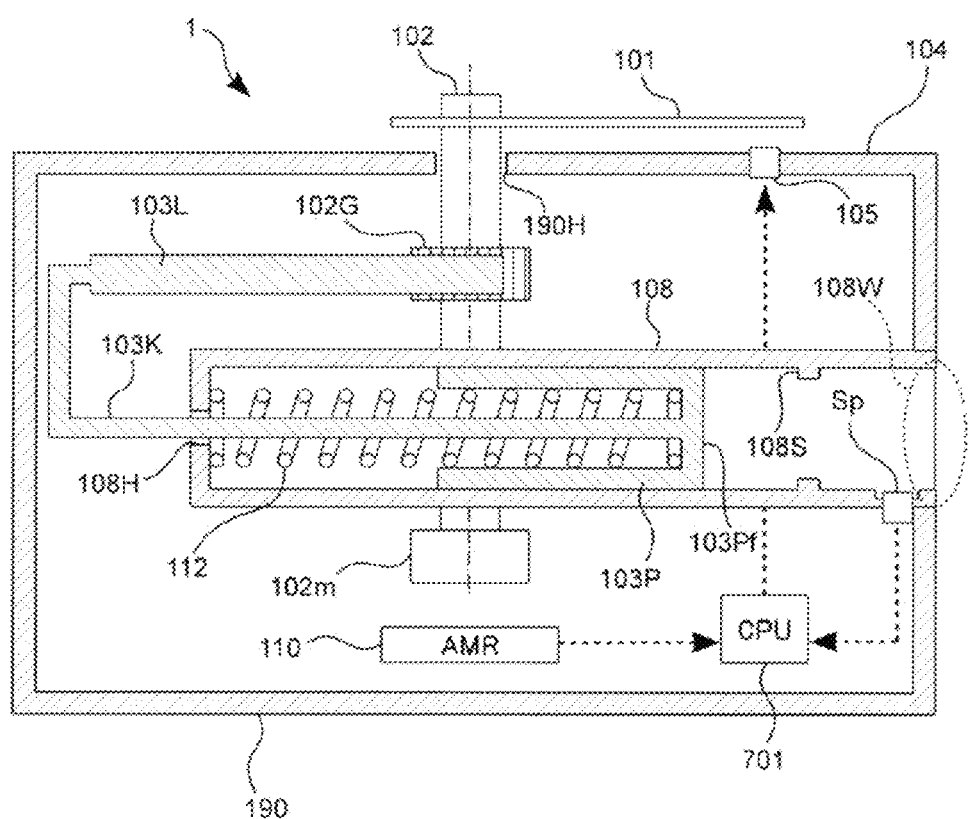
FIG. 3 is a schematic diagram for describing the driving principle of the pressure gauge 1 according to the first embodiment.
Figure 4:
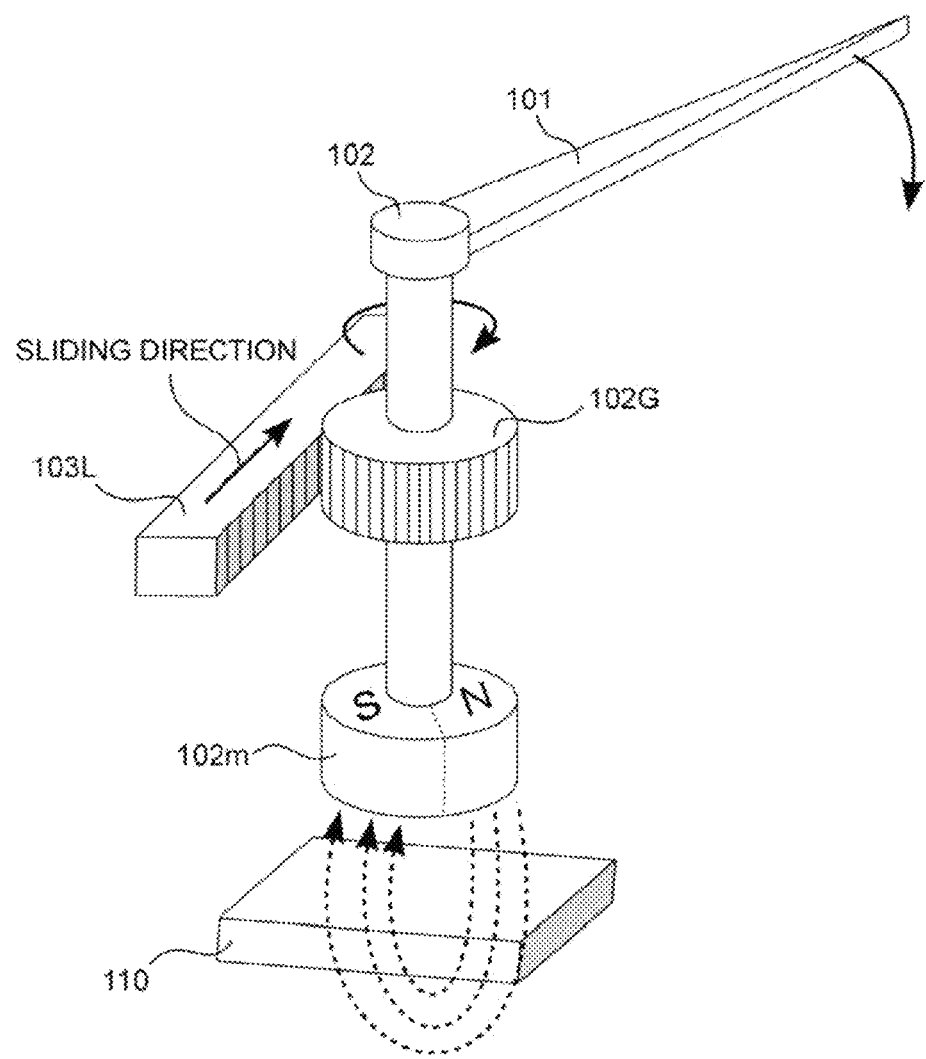
FIG. 4 is a schematic diagram for describing the driving principle of the pressure gauge 1 according to the first embodiment.

FIGS. 2 to 4 are schematic diagrams tor describing a driving principle of the pressure gauge 1 according to the first embodiment. Note that the shapes of the respective components illustrated in FIGS. 2 to 4 are just an example, and the illustrated shapes, positional relationship, and design are not restrictive.

The gauge main body (see FIG. 1) may include, for example, a casing 190, the piston 103P, a cylinder 108, a stopper 108S, a spring 112, a first conversion mechanism, an index 101, the dial 104, momentum detecting means, a pressure sensor Sp, an LED 105 (notifying means), and the like.

It should be appreciated that the piston 103P, the cylinder 108, the stopper 108S, the spring 112, the "first conversion mechanism," the "momentum detecting means," the pressure sensor Sp, the LED 105, and the like here can be integrally configured as a unit to implement a "core gauge" which can be built into casings of various shapes and sizes in common.

The casing 190 has a box-like shape and accommodates the foregoing cote gauge. Here, for example, the casing 190 can support the dial 104 (for example, see FIG. 2). It will be understood that this is not restrictive. For example, the dial 104 maybe configured to be attached to the foregoing core gauge.

The piston 103P has a cylindrical outer shape and receives the pressure, which is a target to be measured, with its pressure receiving surface 103Pf (see FIGS. 2 and 3). To prevent wear-out and the like of the piston 103P due to the spring 112, an annular metal member or the like may be provided on a side of the piston 103P where the pressure receiving surface 103Pf is not formed in a sliding direction. The piston 103P has a protruding portion 103K extending in the sliding direction of the piston 103P. The protruding portion 103K protrudes from the cylinder 106 via a hole 108H formed in the cylinder 108.

The cylinder 108 has an internal space for slidably guiding the piston 103P in a predetermined direction (sliding direction illustrated in FIG. 2), and has an opening 108W for transmitting the pressure from the tire or the like of which to measure the pressure to the internal space of the cylinder 108. As mentioned above, the hole 108H for the protruding portion 103K to be inserted through is formed in the wall of the cylinder 108 opposite from the opening 108W.

The stopper 108S restricts sliding of the piston 103P biased by the spring 112 as will be described later in the internal space of the cylinder 108 toward the opening 108W to stop the piston 103P at a predetermined position.

The spring 112 biases the piston 103P toward the opening 108W and presses the piston 103P against the stopper 108S.

The "first conversion mechanism" converts a linear motion of the piston 103P against the elastic force of the spring 112, the linear motion being caused by the pressure transmitted from the target to be measured to the internal space via the opening 108W, into a rotating motion about a first rotation shaft 102.

Specifically, the "first conversion mechanism" may include, for example, a rack gear 103L and a pinion gear 102G.

The rack gear 103L is connected to the protruding portion 103K extended from the piston 103P, and configured to be integrally slidable with the piston 103P.

The pinion gear 102G is fixed to the first rotation shaft 102, meshes with the rack gear 103L, and rotates about the first rotation shaft 102 according to sliding of the rack gear 103L (see FIG. 4).

The index 101 is fixed to one end side of the first rotation shaft 102 inserted through the dial 104 so that the index 101 lies above the dial 104 (on a side of the dial 104 not opposed to the cylinder 108).

The dial 104 is graduated to display measurement values to be indicated by the index 101 rotating about the first rotation shaft 102. For example, the dial 104 displays measurement values in the range of 0 to 600 [kPa].

The "momentum detecting means" detects momentum that indicates an amount of movement of the piston 103P. For the amount of movement of the piston 103P, an amount of linear movement thereof may be directly detected. The amount of linear movement may be converted into and detected as different momentum.

Here, a case where the "momentum detecting means" includes a magnet 102$m$ and a magnetic sensor 110 will be described as an example.

The magnet 102$m$ is fixed to the other end side of the first rotation shaft 102 and rotates integrally with the first rotation shaft 102.

The magnetic sensor 110 (so-called AMR sensor) detects a change in the magnetic field generated by the magnet 102$m$ rotating integrally with the first rotation shaft 102.

A CPU 701 (determining means) determines a "first measurement value" corresponding to an angular position determined on the basis of the change in the magnetic field detected by the magnetic sensor 110.

In such a manner, the index and the magnet for detecting momentum are integrally provided on one rotation shaft, whereby the amount of rotation of the index can be directly detected. Since the rotating motion of the index can be directly detected without the intermediary of a transmission mechanism, there is no influence of mechanical errors or the like. This can also contribute to improved detection accuracy.

The pressure sensor Sp electrically measures the pressure value of the pressure acting on the internal space of the cylinder 108. For example, the pressure sensor Sp here is arranged on an inner-wall of the cylinder 108 so as to face the internal space from outside the cylinder 108, Kith such a configuration, the pressure sensor Sp measures a "second measurement value."

The LED 105 (notifying means) emits light from inside the casing 109 via a hole formed in the dial 104 so that the light .is visible from outside the apparatus. The LSD 105 can be turned on, blinked, turned off, and the like in a desired light emission pattern by light emission control by the CPU 701.

With such a configuration, the measurement value that is obtained by the pressure sensor Sp of a measurement method other than, a spring type and the measurement value that the user visually observes as a result of a measurement method of spring type are compared. If the difference between these measurement values exceeds a predetermined value, the user is notified of the occurrence of an error exceeding an acceptable limit.

As a result, the user can easily find out in a normal measurement operation whether the measurement value visually observable on the dial 104 contains an error. Such a configuration that allows easy determination of the reliability of the measurement value can also contribute to improving the reliability of operation based on the measurement value.

The present embodiment has dealt with the configuration where the spring 112 is accommodated in the cylinder 108. However, this is not restrictive. It is essential only that the piston 103P can be eventually biased toward the opening side. For example, a member extending from a side of the piston 103P not opposed to the opening 108W in the sliding direction to outside the cylinder 108 may fee provided, and the elastic force of a spring arranged outside the cylinder 108 may be transmitted to the piston 103P in the cylinder 108 via this member.

The present embodiment employs the configuration for notifying the user of the occurrence of a measurement error in the pressure gauge 1 by the light emission of the LED. However, this is not necessarily restrictive. For example, the pressure gauge 1 may include a speaker to notify the occurrence of a measurement error by sound. Another display element such as a liquid crystal panel may be used to display and notify the occurrence of an error. A vibrator may be used to notify the occurrence of a measurement error by vibrations.

<Control Blocks>

Figure 5:
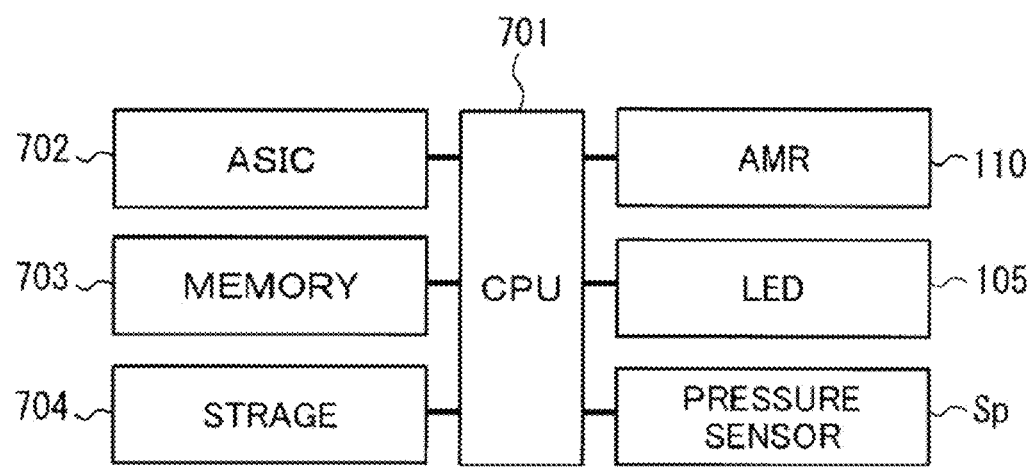
FIG. 5 is a diagram showing an example of control blocks of the pressure gauge 1 according to the embodiment.

FIG. 5 is a diagram showing an example of control blocks of the pressure gauge 1 according to the embodiment.

As illustrated in FIG. 5, the pressure gauge 1 includes, for example, the CPU 701, an ASIC (Application Specific Integrated Circuit) 702, a MEMORY 703, a STRAGE 704, the magnetic sensor (AMR) 110, the LED 105, and the pressure sensor Sp, to name a few.

Various sensors and the like included in the pressure gauge 1, such as the magnetic sensor (AMR) 110, the LED 105, and the pressure sensor Sp, are connected to the CPU 701 via communication lines, such as a parallel bus and a aerial bus, so as to be capable of communication.

The CPU 701 loads a program downloaded from, for example, the STRAGE 704 or outside the apparatus into the MEMORY 703 and executes the program to perform various types of determination processing and the like.

In the pressure gauge 1 according to the present embodiment, the CPU 701 has the role of performing various types of processing in the pressure gauge 1. The CPU 701 also has the role of executing programs stored in the MEMORY 703, the STRAGE 704, and the like to implement various functions. It will be understood that the CPU 701 may be replaced with an MPU (Micro Processing Unit) that can perform equivalent arithmetic processing. Similarly, the STRAGE 704 may be replaced with a storage device such as a flash memory.

The MEMORY 703 may include, for example, a RAM (Random Access Memory), a ROM (Read Only Memory), a DRAM (Dynamic Random Access Memory), an SRAM (Static Random Access Memory), a VRAM (Video RAM), a flash memory, and the like. The MEMORY 703 has the role of storing various types of information and programs to be used in the pressure gauge 1.

<Setting of Zero Point>

In the present embodiment, the piston 103P is pressed against the stopper 108S with a predetermined pressure by the spring 112. The "second measurement value" measured by the pressure sensor Sp has a value higher than the "first measurement value" at least until the "second measurement value" exceeds the pressure value of the predetermined pressure. Details will be described below.

To avoid the occurrence of measurement errors due to poor stability of contact portions with the piston 103P and dimensional errors between parts, the piston 103P is manufactured to be lightly pressed against the stopper 108S by a weak force of the spring 112. This means that the piston 103P is already undergoing a slight predetermined pressure caused by the spring 112 even in a state where the index indicates "zero" on the dial 104.

The piston 103P undergoing such a predetermined pressure therefore will not start to slide in the internal space against the elastic force of the spring 112 until an actual pressure exceeding the predetermined pressure is transmitted thereto via the opening 108W.

In other words, the "first measurement value" by the measurement method of spring type remains zero even if an actual pressure lower than or equal to the foregoing predetermined pressure is transmitted to inside the internal space of the cylinder 108.

In the meantime, the pressure sensor Sp which electrically detects pressure doss not have the concept of the predetermined pressure and the like, and can measure a slight pressure lower than or equal to the foregoing predetermined pressure as a measurement value.

Figure 6:
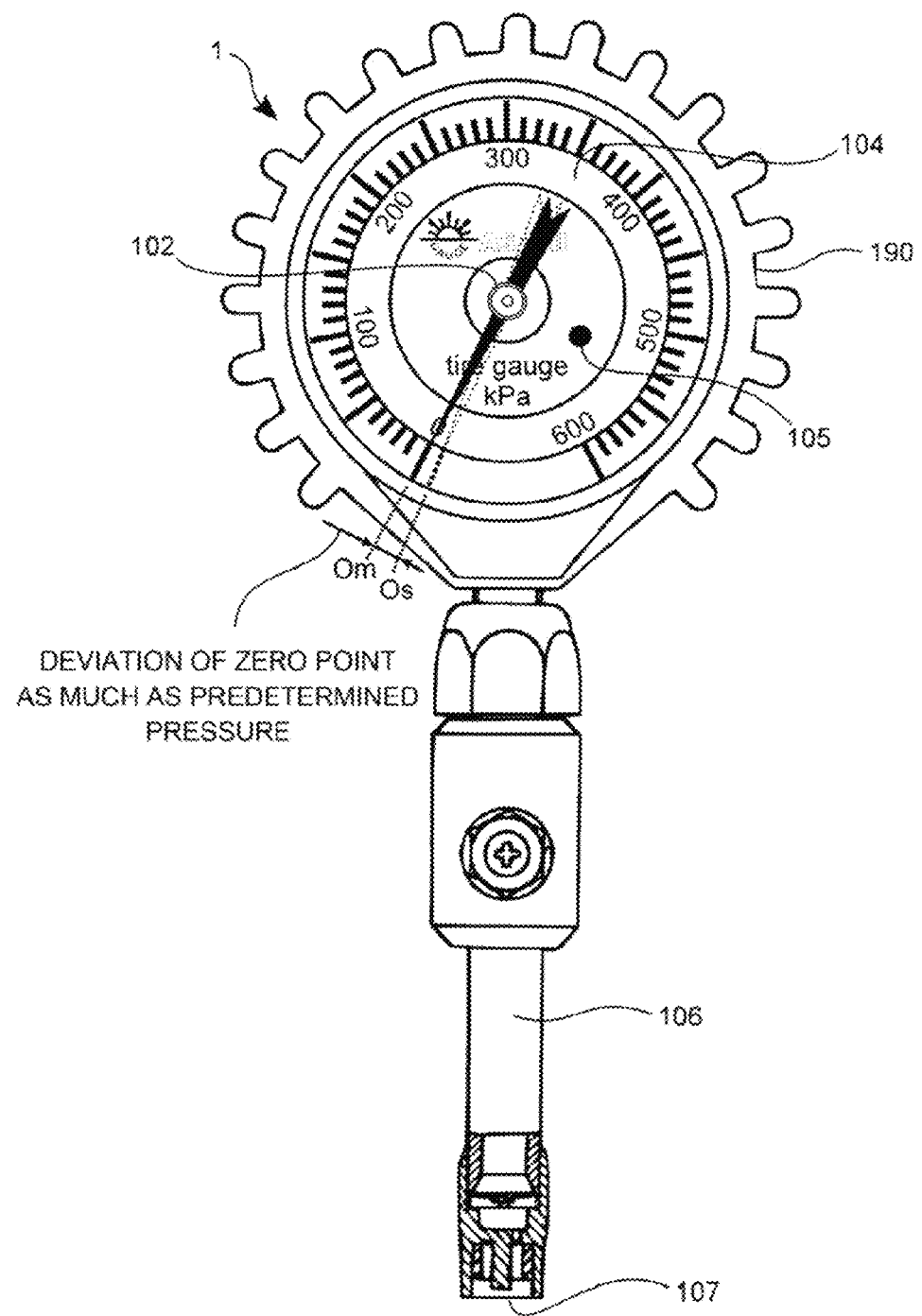
FIG. 6 is a diagram showing a relationship between a aero point Om of a "first measurement value" and a theoretical zero point Os of a "second measurement value."

As described above, the "second measurement value" measured by the pressure sensor Sp is set to be higher than the "first measurement value" at least until the "second measurement value" exceeds the pressure value of the predetermined pressure. In other words, a sere point of the "second measurement value" (zero point Os illustrated in FIG. 6) lies on the negative side with respect to a zero point of the "first measurement value" (zero point Om illustrated in FIG. 6). If the pressure to be measured exceeds the pressure value of the predetermined pressure, the "first measurement value" and the "second measurement value" are not much different unless there is a measurement error.

<Description of Operation>

Figure 7:
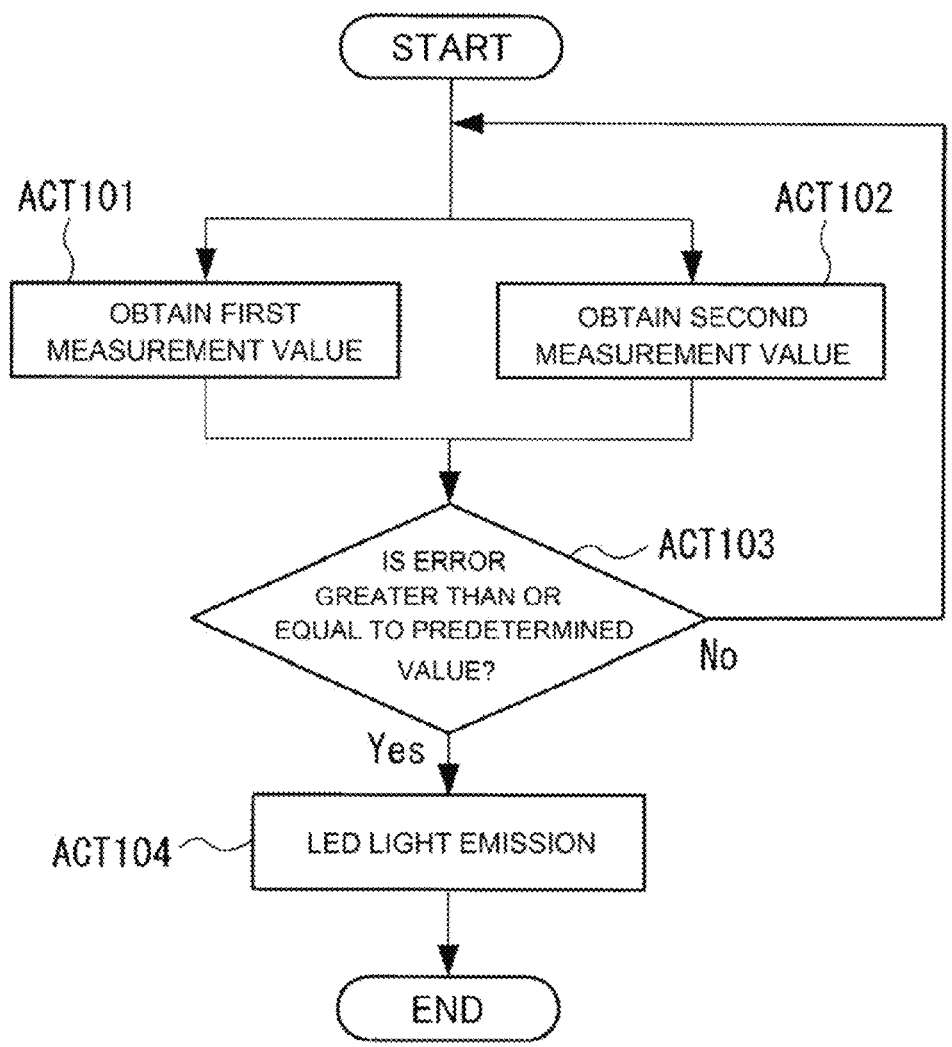
FIG. 7 is a flowchart for describing a flow of processing in the pressure gauge 1 according to the embodiment.

FIG. 7 is a flowchart for describing a flow of processing in the pressure gauge 1 according to the embodiment.

The CPU 701 (determining means) initially obtains both a "first measurement value" indicated by the index on the dial, estimated from the momentum detected by the "momentum detecting means" including the magnet 102*m*, the magnetic sensor 110, and the like, and a "second measurement value" measured by the pressure sensor Sp (ACT101 and ACT102). Here, both the "first measurement value" and the "second measurement value" need only to eventually have been obtained when determination processing of ACT103 to be described later is performed. Either of the two values may be obtained first. Both may be simultaneously obtained. Here, the estimation of the "first measurement value" is performed, for example, on the basis of a data table or function that indicates the correspondence between the detection value of the magnetic sensor 110 and the "first-measurement value."

Next, on the basis of the "first measurement value" and the "second measurement value" obtained as described above, the CPU 701 determines whether the difference between the two values exceeds a predetermined value (acceptable error value) (ACT103).

If the CPU 701 (determining means) determines that the difference between the "first measurement value" and the "second measurement value" exceeds the foregoing "predetermined value," the LED 105 (notifying means) notifies the user of it by using an arbitrary light emission pattern. Here, the notification of the occurrence of an error is not necessarily limited to one using light emission. The LED 105 may be constantly turned on or the like at normal time, and may be turned off when an error occurs.

The operations of the foregoing processing in the pressure gauge are implemented by making the CPU 701 execute a measurement error occurrence detection program stored in the MEMORY 703.

Second Embodiment

Next, a second embodiment of the present invention will be described.

Figure 8:
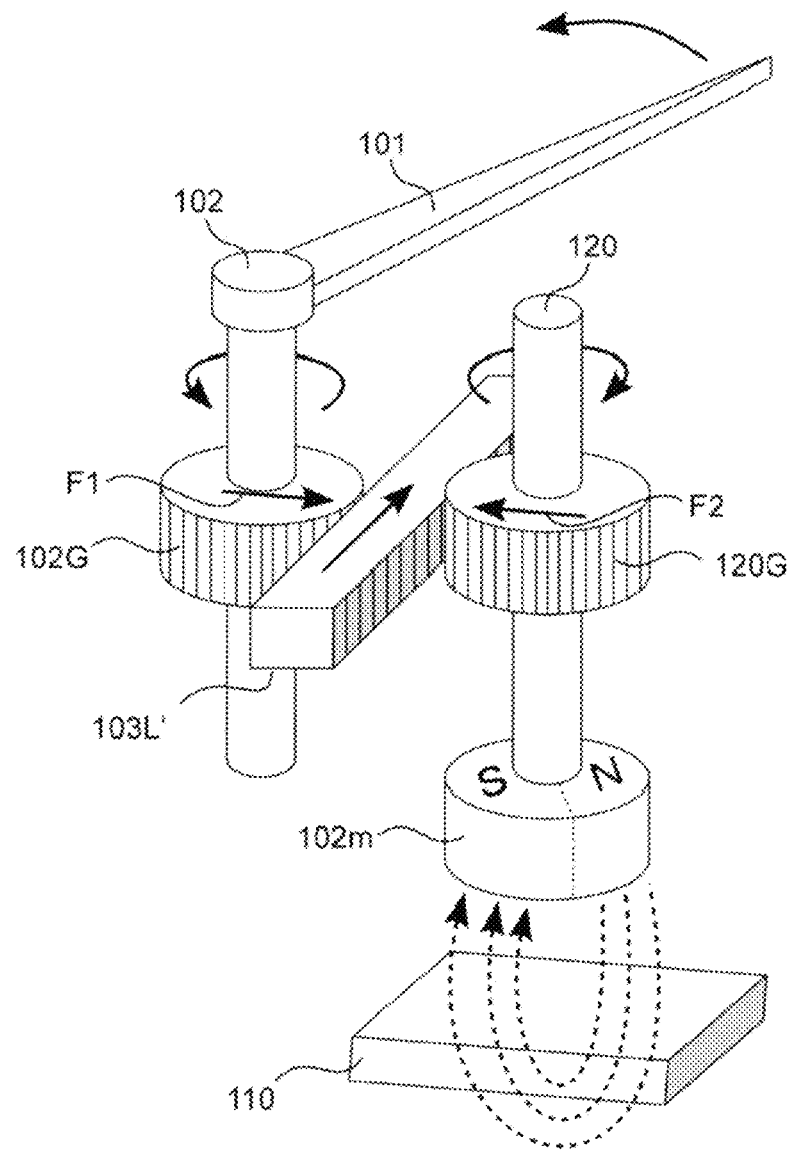
FIG. 8 is a schematic diagram for describing the driving principle of a pressure gauge according to a second embodiment.

The present embodiment is a modification of the foregoing first embodiment. The second embodiment differs from the first embodiment, for example, in the configuration of the momentum detecting means. In the present embodiment, portions having the same functions as those of the portions already described in the foregoing first embodiment will hereinafter be designated by the same reference numerals as those in the first embodiment. A description thereof will be omitted, FIG. 8 is a schematic diagram for describing the driving principle of the pressure gauge according to the second embodiment. Note that the shapes of the respective components illustrated in FIG. 8 are just an example and not limited to the illustrated design.

In the second embodiment, the rotation of the first rotation shaft 102 is used to rotate the index 101. In the second embodiment, a second rotation shaft 120 is arranged in parallel with the first rotation shaft 102, The cylinder 103 is arranged between the first rotation shaft 102 and the second rotation shaft 120.

The pressure gauge according to the second embodiment includes a "second conversion mechanism" and "rotation amount detecting means" as the momentum detecting means.

Specifically, the "second conversion mechanism" here converts, for example, the linear motion of the piston 103P against the elastic force of the spring 112, caused by the pressure transmitted from the target to be measured to the internal space of the cylinder 108 via the opening 108W, into a rotating motion around the second rotation shaft 120. Specifically, in the second embodiment, the "second conversion mechanism" may include, for example, a rack gear 103L' and a pinion gear 120G. The rack gear 103L' includes a rack gear (corresponding to the rack gear 103L of the first embodiment) that meshes with the pinion gear 102G fixed to the rotation shaft 102 of the index 101. The rack gear 103L' further includes a rack gear that is formed on a side opposite from where the rack gear meshing with the pinion gear 102G is formed, and meshes with the pinion gear 120G. The pinion gear 120G is fixed to the second rotation shaft 120, meshes with the rack gear 103L', and rotates about the second rotation shaft 120 according to sliding of the rack gear 103L' (see FIG. 8). In other words, the movement of the rack gear 103L' rotates both the pinion gear 102G and the pinion gear 120G.

The "rotation amount detecting means" include, for example, a magnet 120m which is fixed to the second rotation shaft 120, and the magnetic sensor 110 which detects a change in the magnetic field generated by the magnet 120m rotating integrally with the second rotation shaft 120.

With such a configuration, the CPU 701 (determining means) determines a "first measurement value" corresponding to an angular position determined on the basis of the change in the magnetic field detected by the magnetic sensor 110.

An advantage of the configuration in which the second rotation shaft is provided to convert the linear motion of the piston 103P against the elastic force of the spring 112 into a rotating motion will be described.

Since the index 101 of the pressure gauge makes a rotating motion, the gauge main body is usually formed in a generally circular outline. In terms of space efficiency in miniaturizing the apparatus, it is reasonable to arrange the cylinder 108 in a position passing through the central part of the generally circular outline.

Examples of the reasons include the following (1) to (4).
(1) If the cylinder 108 is arranged as described above with respect to the gauge main body, the cylinder 108 can foe maximized in length. In other words, the outer diameter of the gauge main body can be minimized for the same cylinder length.
(2) The arrangement that can maximize the cylinder length allows a maximum use of the expanding and. contracting strokes of the spring 112. In pressure measurement, making the maximum use of the spring strokes contributes to improved accuracy of the pressure gauge.
(3) In terms of the space efficiency of the entire apparatus, it is reasonable to arrange the index near the center of the gauge main body which has a circular outline.
(4) In view of the foregoing, it can therefore be said to foe reasonable to arrange the index on the gauge main body almost directly above the cylinder. However, the vicinity of the cylinder is severely restricted in space due to a relationship with other components such as the dial and electronic parts, and the magnetic sensor may be difficult to arrange. In particular, with a configuration where the linear motion is converted into a rotating motion and the amount of rotation of the rotating motion is detected by using a magnetic sensor, the magnetic sensor is desirably arranged on an end of a rotation shaft opposite from a side where the index is arranged.

As described above, according to the configuration, of the second embodiment, detecting means for detecting rotational momentum, such as a magnetic sensor, are arranged in the configuration where the linear motion of the piston is converted into a rotating motion. Here, an independent momentum transmission path for detecting the rotational momentum can be provided without being restricted by the arrangement of the index. This can also contribute to improving the degree of freedom in design. A configuration in which the first rotation shaft and the second rotation shaft are not parallel to each other may be employed if needed.

As described above, the linear motion of the piston 103P sliding inside the cylinder 108 is transmitted to the two shafts on both sides of the cylinder 108. With such a configuration, the two rotation shafts can receive and. cancel out a reactive force occurring when a force is transmitted from the piston 103P to the rotation shaft side. This enables a dynamically stable mechanism.

Third Embodiment

Next, a third embodiment of the present invention will be described. FIG. 3 is a schematic diagram, for describing the driving principle of the pressure gauge according to the third embodiment.

The foregoing first embodiment has dealt with the configuration in which the stopper 108S is formed on the inner peripheral of the cylinder 108. However, this is not restrictive. It is essential only that the sliding of the piston 103P can eventually be restricted.

Figure 9:
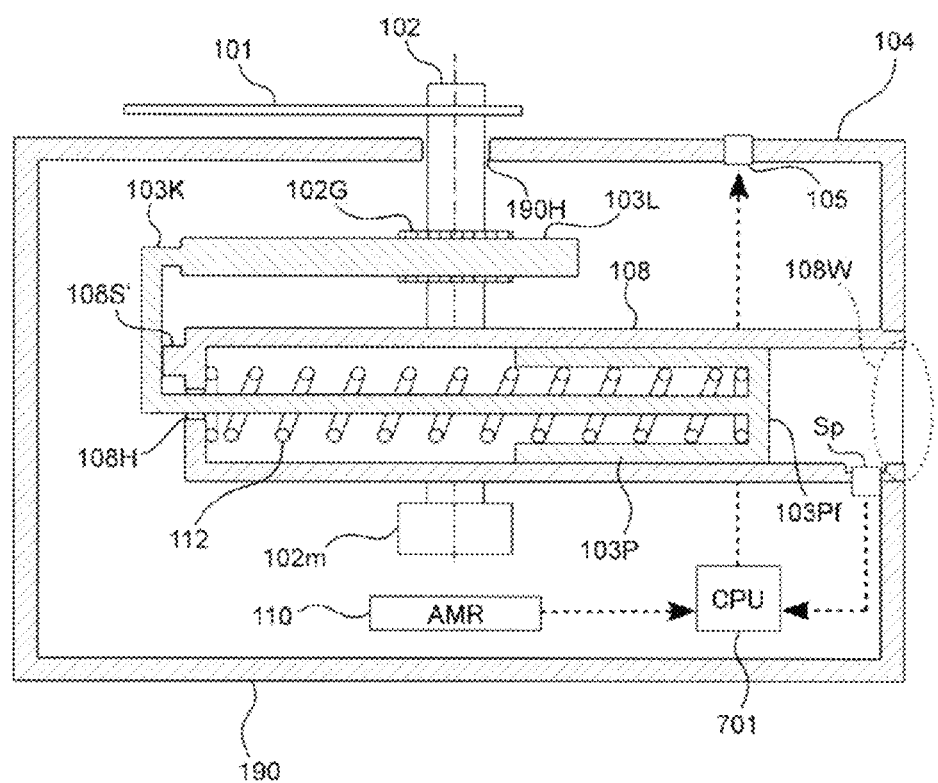
FIG. 9 is a schematic diagram for describing the driving principle of a pressure gauge according to a third embodiment.

For example, a member that extends from a side of the piston 103P not opposed to the opening 108W in the sliding direction to outside the cylinder 108 may be provided. A stopper 108S' provided outside the cylinder 108 may be brought into engagement or the like with that member to restrict the movement of the piston 103P (see FIG. 9).

The foregoing embodiments have dealt with the configuration in which the magnetic sensor is employed as the means for detecting the amount of rotation of the rotation shaft. However, this is not restrictive. For example, a reflection type or transmission type optical sensor or the like may be used to detect the amount of rotation of the rotation shaft. In other words, any means that can eventually convert the rotational momentum of the rotation shaft to be detected into an arbitrary physical amount may be employed.

Moreover, a program for causing a computer constituting the pressure gauge to perform the foregoing operations may be provided as a measurement error occurrence detection program. The present embodiment has dealt with the case where the program for implementing the functions for carrying out the invention is previously recorded in a recording area provided inside the apparatus. However, this is not restrictive. A similar program may be downloaded from a network to the apparatus. A similar program recorded on a computer-readable recording medium may be installed on the apparatus. Any form, of recording medium that can store the program and is computer-readable may be used. Specific examples of the recording medium may include internal storage devices implemented inside the computer, such as a ROM and a RAM, portable storage media such as a CD-ROM, a flexible disk, a DVD disk, a magneto-optic disk, and an IC card, a database containing a computer program, another computer and its database, and a transmission medium online.

It will be understood that at least part of the various types of processing implemented, by making the CPU or MPU execute the program in the foregoing embodiments can foe performed by means of circuitry by the ASIC 702.

As described above, arbitrary ones of the foregoing embodiments may be freely combined with each other so far as they are not technically inconsistent.

The present invention may be embodied in various other forms without departing from the spirit or essential, characteristics thereof. The foregoing embodiments are therefore to be considered in ail respects as illustrative to facilitate understanding and not restrictive. The scope of the present invention is indicated by the appended claims rather than by the foregoing description. All changes which come within the meaning and range of equivalency of the claims, and various improvements, alternatives, and modifications are therefore intended to be encompassed therein.

REFERENCE SIGNS LIST 190 casing
103P piston
108 cylinder
108S stopper
112 spring
101 index
104 dial
Sp pressure sensor
105 LSD

The invention claimed is:

1. A pressure gauge comprising:
a piston;
a cylinder that has an internal space for slidably guiding the piston in a predetermined direction and has an opening for transmitting pressure from a target of which to measure pressure to the internal space;
a stopper that restricts sliding of the piston in the internal space toward the opening to stop the piston at a predetermined position;
a spring that biases the piston toward the opening and press the piston against the stopper;
a first conversion mechanism that converts a linear motion of the piston against an elastic force of the spring into a rotating motion about a first rotation shaft, the linear motion being caused by the pressure transmitted from the target to be measured to the internal space via the opening;
an index that is fixed to one end side of the first rotation shaft;
a dial that displays a measurement value to be indicated by the index rotating about the first rotation shaft;
momentum detecting means for detecting momentum indicating an amount of movement of the piston;
a pressure sensor that measures a pressure value of the pressure acting on the internal space of the cylinder;
determining means for determining whether a difference between a first measurement value and a second measurement value exceeds a predetermined value, the first measurement value being estimated from the momentum detected by the momentum detecting means and indicated on the dial by the index, the second measurement value being measured toy the pressure sensor; and
notifying means for notifying a user if the determining means determines that the difference between the first measurement value and the second measurement value exceeds the predetermined value.

2. The pressure gauge according to claim 1, wherein;
the piston is pressed against the stopper by the spring with a predetermined pressure; and
the second measurement value measured by the pressure sensor is higher than the first measurement value at least until the second measurement value exceeds a pressure value of the predetermined pressure.

3. The pressure gauge according to claim 1, wherein;
the momentum detecting means includes
a magnet that is fixed to the other end side of the first rotation shaft, and
a magnetic sensor that detects a change in a magnetic field generated by the magnet rotating integrally with the first rotation shaft; and
the determining means determines the first measurement value corresponding to an angular position determined on the basis of the change in the magnetic field detected by the magnetic sensor.

4. The pressure gauge according to claim 1, wherein
the first conversion mechanism includes
a rack gear that is integrally slidable with the piston, and
a pinion gear that is fixed to the first rotation shaft, meshes with the rack gear, and rotates about the first rotation shaft according to sliding of the rack gear.

5. The pressure gauge according to claim 1, wherein:
the momentum detecting means includes
a second conversion mechanism that converts the linear motion of the piston against the elastic force of the spring into a rotating motion about a second rotation shaft, the linear motion being caused by the pressure transmitted from the target to be measured to the internal space via the opening, and rotation amount detecting means for detecting an amount of rotation of the second rotation shaft;

the cylinder is arranged between the first rotation shaft and the second, rotation shaft; and the determining means determines the first measurement value corresponding to an angular position determined on the basis of the amount of rotation detected by the rotation amount detecting means.

6. The pressure gauge according to claim 5, wherein:

the rotation amount detecting means includes
- a magnet that is fixed to the second rotation shaft, and
- a magnetic sensor that detects a change in a magnetic field generated by the magnet rotating integrally with the second rotation shaft; and the determining means determines the first measurement value corresponding to an angular position determined on the basis of the change in the magnetic field detected, by the magnetic sensor.

* * * * *